(12) United States Patent
Ren et al.

(10) Patent No.: US 12,549,483 B2
(45) Date of Patent: Feb. 10, 2026

(54) ROUTE ADVERTISEMENT METHOD, NETWORK DEVICE, AND COMPUTER STORAGE MEDIUM

(71) Applicant: HUAWEI TECHNOLOGIES CO., LTD., Shenzhen (CN)

(72) Inventors: Huajun Ren, Nanjing (CN); Tong Zhu, Nanjing (CN); Jiutao Ding, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/595,005

(22) Filed: Mar. 4, 2024

(65) Prior Publication Data
US 2024/0214310 A1  Jun. 27, 2024

Related U.S. Application Data

(63) Continuation of application No. PCT/CN2022/101607, filed on Jun. 27, 2022.

(30) Foreign Application Priority Data

Sep. 30, 2021  (CN) .......................... 202111161855.9

(51) Int. Cl.
*H04L 45/76* (2022.01)
*H04L 45/00* (2022.01)
*H04L 45/741* (2022.01)

(52) U.S. Cl.
CPC .............. *H04L 45/76* (2022.05); *H04L 45/34* (2013.01); *H04L 45/741* (2013.01)

(58) Field of Classification Search
CPC ....... H04L 45/76; H04L 45/34; H04L 45/741; H04L 45/02; H04L 45/50; H04L 45/66; H04L 12/4641
See application file for complete search history.

(56) References Cited

U.S. PATENT DOCUMENTS

2013/0148657 A1  6/2013  Salam et al.
2018/0109400 A1* 4/2018  Brissette ............. H04L 12/4633

FOREIGN PATENT DOCUMENTS

CN    110832813 A  *  2/2020  ......... H04L 12/4633
EP       3190752 B1     3/2019

OTHER PUBLICATIONS

Virtual Private Wire Service Support in Ethernet VPN, RFC8214 (Year: 2017).*

(Continued)

*Primary Examiner* — Messeret F Gebre
(74) *Attorney, Agent, or Firm* — Leydig, Voit & Mayer, Ltd.

(57) ABSTRACT

A route advertisement method, a network device, and a computer storage medium are provided, and pertain to the field of communication technologies. According to this application, an EVPN SRv6 route advertisement packet is extended to carry pseudo-wire identification information of an L2VPN PW between a first network device and a second network device, to help find, based on the pseudo-wire identification information, a forwarding entry associated with the L2VPN PW, and further process the forwarding entry associated with the L2VPN PW, thereby evolving an MPLS forwarding-based L2VPN VPWS into an SRv6 forwarding-based EVPN VPWS, or evolving an MPLS forwarding-based L2VPN VPLS into an SRv6 forwarding-based EVPN VPLS. In addition, the MPLS forwarding-based L2VPN VPWS or VPLS can be evolved into another type of EVPN SRv6 network.

20 Claims, 4 Drawing Sheets (56) References Cited

OTHER PUBLICATIONS

B. Adebisi, A. Sutherland and B. Honary, "Wire integrity testing using intermodulation product processing," 2008 IEEE International Symposium on Power Line Communications and Its Applications, Jeju, Korea (South), 2008, pp. 213-217 (Year: 2008).*

P. Knight and C. Lewis, "Layer 2 and 3 virtual private networks: taxonomy, technology, and standardization efforts," in IEEE Communications Magazine, vol. 42, No. 6, pp. 124-131, Jun. 2004. (Year: 2004).*

Brissette et al., "EVPN-VPWS Seamless Integration with L2VPN VPWS draft-brissette-bess-evpn-vpws-seamless-04," Total 16 pages (Jul. 2021).

* cited by examiner

| A second network device issues a route advertisement packet, where the route advertisement packet advertises an EVPN SRv6 route, next-hop information that is of the EVPN SRv6 route and that is carried in the route advertisement packet is an IPv6 address of the second network device, the route advertisement packet further carries pseudo-wire identification information, and the pseudo-wire identification information identifies an L2VPN PW between a first network device and the second device | ~301 |
|---|---|

| The first network device receives the route advertisement packet from the second network device | ~302 |
|---|---|

| A first network device receives a route advertisement packet from a second network device, where the route advertisement packet advertises an EVPN SRv6 route, next-hop information that is of the EVPN SRv6 route and that is carried in the route advertisement packet is an IPv6 address of the second network device, and next-hop information that is of the EVPN SRv6 route and that is locally stored in the first network device is an IPv4 address of the second network device | 601 |

| The first network device selects one of the IPv6 address of the second network device and the IPv4 address of the second network device as next-hop information of the EVPN SRv6 route | 602 |

ROUTE ADVERTISEMENT METHOD, NETWORK DEVICE, AND COMPUTER STORAGE MEDIUM

CROSS-REFERENCE TO RELATED APPLICATIONS

This application is a continuation of International Application No. PCT/CN2022/101607, filed on Jun. 27, 2022, which claims priority to Chinese Patent Application No. 202111161855.9, filed on Sep. 30, 2021. The disclosures of the aforementioned applications are hereby incorporated by reference in their entireties.

TECHNICAL FIELD

Embodiments of this application relate to the field of communication technologies, and in particular, to a route advertisement method, a network device, and a computer storage medium.

BACKGROUND

A pseudo-wire (PW) is a communication connection established between edge devices (Provider Edges, PEs) in a packet network. Different PEs communicate with each other through a PW. Currently, a PW between PEs is usually created based on a Layer 2 virtual private network virtual private wire service (L2VPN VPWS). However, with the development of the Ethernet virtual private network (EVPN) technology, a PE can usually support both services, that is, an L2VPN VPWS and an EVPN VPWS, to create the PW. In this scenario, how to evolve the L2VPN VPWS into the EVPN VPWS is a current research hotspot.

SUMMARY

Embodiments of this application provide a route advertisement method, a network device, and a computer storage medium, to evolve an MPLS forwarding-based L2VPN VPWS into an SRv6 forwarding-based EVPN VPWS. The technical solutions are as follows:

According to a first aspect, a route advertisement method is provided. In this method, a first network device receives a route advertisement packet from a second network device. The route advertisement packet advertises an EVPN SRv6 route. Next-hop information that is of the EVPN SRv6 route and that is carried in the route advertisement packet is an IPV6 address of the second network device. In addition, the route advertisement packet further carries pseudo-wire identification information. The pseudo-wire identification information identifies an L2VPN PW between the first network device and the second device.

In an embodiment of this application, the EVPN SRv6 route advertisement packet is extended, so that the extended EVPN SRv6 route advertisement packet carries the pseudo-wire identification information of the L2VPN PW between the first network device and the second network device. In this way, the route advertisement message is extended, to enable the route advertisement message to carry the pseudo-wire identification information related to the L2VPN PW while advertising a route, and enable a network device to smoothly evolve an MPLS forwarding-based L2VPN into an SRv6-based EVPN in an existing network transition scenario. A PW in the existing L2VPN can be disabled timely, and a PW of EVPN SRv6 can be established successfully. For example, in a scenario in which the first network device is a PE1, the second network device is a PE2, and the EVPN SRv6 route advertisement packet is an EVPN-VPWS SRv6 route advertisement packet, when the PE1 receives the EVPN-VPWS SRv6 route advertisement packet sent by the PE2, the PE1 can further locally search for an L2VPN PW based on the pseudo-wire identification information when establishing a PW based on the EVPN SRv6, to process the L2VPN PW, thereby evolving an MPLS forwarding-based L2VPN VPWS into an SRv6 forwarding-based EVPN VPWS.

In addition, through the method provided in this embodiment of this application, in a process of evolving a conventional L2VPN into an EVPN SRv6 network scenario, the L2VPN PW that has been established can be processed while establishing the EVPN SRv6-based PW. Moreover, in a scenario of evolving a conventional L2VPN into another type of EVPN SRv6, the L2VPN PW that has been established can be processed while another type of EVPN SRv6 route is created.

In a possible implementation, in the method, the first network device disables the L2VPN PW based on the pseudo-wire identification information.

Specifically, in a scenario of evolving the conventional L2VPN into the EVPN SRv6 network, the L2VPN PW may be disabled (set to down). That the L2VPN PW is disabled may be deleting a forwarding entry associated with the L2VPN PW, or invalidating a forwarding entry associated with the L2VPN PW. In this way, a packet is not forwarded based on the L2VPN PW subsequently, and instead, is forwarded based on a newly advertised EVPN SRv6 route.

In a possible implementation, in the method, the first network device establishes an EVPN SRv6 PW. A destination address of the EVPN SRv6 PW is the IPV6 address of the second network device. The first network device further configures a priority of the EVPN SRv6 PW to be higher than a priority of the L2VPN PW.

Specifically, in a scenario in which the EVPN SRv6 PW is established based on the route advertisement packet, in addition to disabling the L2VPN PW, the L2VPN PW may not be disabled, but the priority of the L2VPN PW is lowered. In this way, the EVPN SRv6 PW is preferentially used when the packet is forwarded.

In a possible implementation, the established EVPN SRv6 PW is a PW in a VPWS or a PW in a VPLS. In other words, the PW included in this embodiment of this application may be the PW in the VPWS, or may be the PW in the VPLS, to evolve the MPLS forwarding-based L2VPN VPWS into the SRv6 forwarding-based EVPN VPWS, or evolve the MPLS forwarding-based L2VPN VPLS into the SRv6 forwarding-based EVPN VPLS.

In a possible implementation, the route advertisement packet includes an extended community attribute, and the extended community attribute carries the pseudo-wire identification information.

Specifically, the extended community attribute in the route advertisement packet may be extended, so that the extended community attribute after being further extended can carry the pseudo-wire identification information of the L2VPN PW between the first network device and the second network device.

In a possible implementation, the extended community attribute includes a type field and a pseudo-wire identifier field. The type field indicates that the extended community attribute carries the pseudo-wire identification information, and the pseudo-wire identifier field carries the pseudo-wire identification information. In another possible implementation, the extended community attribute includes a type field and a global administrator field. The type field indicates that the extended community attribute carries feature information of an IPV4 address, and the global administrator field carries the pseudo-wire identification information.

Based on the foregoing two implementations, an existing extended community attribute may be extended, or a new extended community attribute may be extended, so that the extended community attribute after being further extended can carry the pseudo-wire identification information of the L2VPN PW between the first network device and the second network device.

In a possible implementation, the pseudo-wire identification information includes one or more of the following: an IPv4 address of the second network device, an identifier of the L2VPN PW, and a site identifier.

In this embodiment of this application, the L2VPN PW between the first network device and the second network device may be identified by different pseudo-wire identification information.

According to a second aspect, a route advertisement method is provided. In the method, a second network device issues a route advertisement packet to a first network device. The route advertisement packet advertises an EVPN SRv6 route. Next-hop information that is of the EVPN SRv6 route and that is carried in the route advertisement packet is an IPV6 address of the second network device. The route advertisement packet further carries pseudo-wire identification information. The pseudo-wire identification information identifies an L2VPN PW between the first network device and the second device.

In a possible implementation, the route advertisement packet includes an extended community attribute, and the extended community attribute carries the pseudo-wire identification information.

In a possible implementation, the extended community attribute includes a type field and a pseudo-wire identifier field. The type field indicates that the extended community attribute carries the pseudo-wire identification information, and the pseudo-wire identifier field carries the pseudo-wire identification information. In another possible implementation, the extended community attribute includes a type field and a global administrator field. The type field indicates that the extended community attribute carries feature information of an IPV4 address, and the global administrator field carries the pseudo-wire identification information.

In a possible implementation, the pseudo-wire identification information includes one or more of the following: an IPV4 address of the second network device, an identifier of the L2VPN PW, and a site identifier.

For technical effects of the route advertisement method, refer to the technical effects of the route advertisement method according to the first aspect. Details are not described herein again.

According to a third aspect, a route advertisement method is provided. In the method, a first network device receives a route advertisement packet from a second network device. The route advertisement packet advertises an EVPN SRv6 route. Next-hop information that is of the EVPN SRv6 route and that is carried in the route advertisement packet is an IPV6 address of the second network device, and next-hop information that is of the EVPN SRv6 route and that is locally stored in the first network device is an IPV4 address of the second network device. Then, the first network device selects one of the IPV6 address of the second network device and the IPV4 address of the second network device as next-hop information of the EVPN SRv6 route.

Through the route advertisement method, an MPLS network forwarding-based EVPN-VPWS is evolved into an SRv6 network forwarding-based EVPN-VPWS.

According to a fourth aspect, a first network device is provided. The first network device has a function of implementing the behaviors of the route advertisement method in the first aspect. The first network device includes at least one unit. The at least one unit is configured to implement the route advertisement method according to the first aspect.

According to a fifth aspect, a second network device is provided. The second network device has a function of implementing the behaviors of the route advertisement method in the second aspect. The second network device includes at least one unit. The at least one unit is configured to implement the route advertisement method according to the second aspect.

According to a sixth aspect, another first network device is provided. The first network device has a function of implementing the behaviors of the route advertisement method in the third aspect. The first network device includes at least one unit. The at least one unit is configured to implement the route advertisement method according to the third aspect.

According to a seventh aspect, a first network device is provided. A structure of the first network device includes a memory, storing instructions, and a processor, connected to the memory. When the instructions are run in the processor, the first network device is enabled to perform the route advertisement method.

According to an eighth aspect, a second network device is provided. A structure of the second network device includes a memory, storing instructions, and a processor, connected to the memory. When the instructions are run in the processor, the second network device is enabled to perform the route advertisement method.

According to a ninth aspect, a computer-readable storage medium is provided. The computer-readable storage medium stores instructions. When the instructions are run on a computer, the computer is enabled to perform the route advertisement method according to the first aspect, the second aspect, or the third aspect.

According to a tenth aspect, a computer program product including instructions is provided. When the computer program product is run on a computer, the computer is enabled to perform the route advertisement method according to the first aspect, the second aspect, or the third aspect.

According to an eleventh aspect, a communication system is provided. The communication system includes the first network device and the second network device.

Technical effects obtained in the fourth aspect to the eleventh aspect are similar to technical effects obtained through corresponding technical means in the first aspect, the second aspect, and the third aspect. Details are not described herein again.

DESCRIPTION OF EMBODIMENTS

To make the objectives, technical solutions, and advantages of this application clearer, the following further describes the implementations of this application in detail with reference to the accompanying drawings.

Before embodiments of this application are described in detail, an application scenario of embodiments of this application is first described.

Multi-protocol label switching (MPLS) L2VPN refers to an MPLS-based Layer 2 VPN (Virtual Private Network) technology, and is an implementation of pseudo-wire emulation edge-to-edge (PWE3). The MPLS L2VPN encapsulates Layer 2 data (such as an Ethernet data frame and an asynchronous transfer mode (ATM) cell) of a user into a packet that can be transmitted in an MPLS network. The encapsulated packet is forwarded through an MPLS tunnel. A receive end decapsulates the packet and restores the original Layer 2 data. In this way, the Layer 2 data of the user is transparently transmitted across the MPLS network. From the perspective of the user, the MPLS network is a Layer 2 switching network. A Layer 2 connection can be established between different sites of a user network.

Currently, a networking type of the MPLS L2VPN may include a VPWS, a VPLS, and the like.

The VPWS is a Layer 2 VPN technology that provides a point-to-point service. The VPWS is a Layer 2 service bearing technology that emulates, as accurately as possible, a basic behavior and a feature of a service, such as an ATM, a frame relay, an Ethernet, and a low-speed (TDM) circuit, in a packet-switched network (PSN). The VPWS technology is a point-to-point virtual private line technology that supports almost all link layer protocols. PES communicate with each other through an established PW.

The VPLS is a point-to-multipoint L2VPN service provided on a shared network. The VPLS also uses a signaling protocol to establish and maintain a PW between PE nodes in a VPLS instance, so that a Layer 2 protocol frame is encapsulated and then transmitted and exchanged on the PW. In this way, a plurality of local area networks within a wide area are integrated into one network at the data link level to provide a virtual Ethernet service for the user. In other words, point-to-multipoint communication in the VPLS is also based on the established PW.

The PW included in embodiments of this application may be a PW established based on the VPWS technology, or may be a PW established based on the VPLS technology.

With the development of the L2VPN, shortcomings, such as a failure of load balancing, and large consumption of network resources, of the L2VPN have emerged. Based on this, the EVPN emerges as required. The EVPN extends a BGP protocol to transfer the process of learning and issuing a MAC address between Layer 2 networks from a data plane to a control plane. In this way, the device is enabled to manage the MAC address like managing a route, so that the load balancing can be implemented among a plurality of EVPN routes with a same destination MAC address and different next hops. In addition, through use of the EVPN technology, full connections between PE devices on a backbone network of an operator do not need to be established any more. This greatly reduces network complexity, reduces a quantity of network signaling, and further avoids the waste of network resources.

Based on the advantages of the EVPN technology, the L2VPN VPWS can be evolved into an EVPN VPWS, and the L2VPN VPLS can be evolved into an EVPN VPLS.

In addition, the VPWS and the VPLS are described in an MPLS scenario. With the development of a segment routing technology and the overall network evolution from an IPV4 to an IPV6, a segment routing over IPv6 (SRv6) technology gradually becomes mature. In the SRv6 technology, SRH extension is added to an IPV6 packet to replace a conventional label forwarding function in the MPLS, and a 128-bit IPv6 address is used as an identifier SID of a network node. During data transmission, in the SRv6, SIDs of all nodes on a transmission path are collected at an ingress node, and are placed in an SRH in a form of a SID list (Segment List). In addition, a quantity of intermediate nodes that need to be accessed from a current node to a destination node is indicated by segment left (SL), so that an SL value is modified to implement a next hop. Based on the advantages, the SRv6 technology gradually replaces the MPLS technology.

In this scenario, how to evolve an MPLS forwarding-based L2VPN or EVPN VPWS into an SRv6 forwarding-based EVPN VPWS and evolve an MPLS forwarding-based L2VPN VPLS or EVPN VPLS into an SRv6 forwarding-based EVPN VPLS is a feature of the current research. The route advertisement method according to embodiments of this application is for implementing evolution in these aspects.

The following describes a network architecture included in an embodiment of this application.

Figure 1:
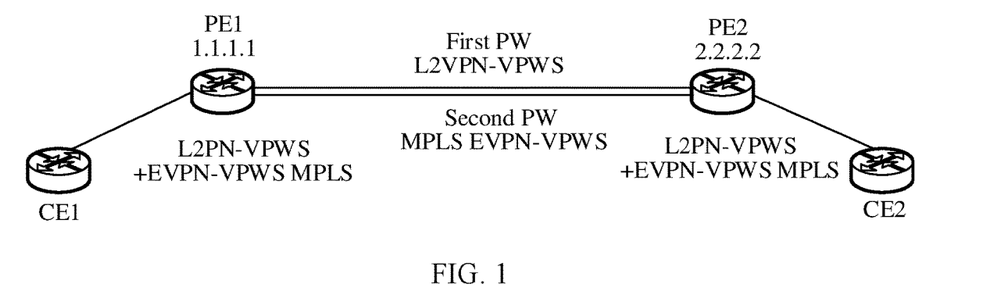
FIG. 1 is a schematic diagram of a network architecture of a VPWS according to an embodiment of this application.

FIG. 1 is a schematic diagram of a network architecture of a VPWS according to an embodiment of this application. As shown in FIG. 1, a PE1, a PE2, a customer edge router (customer edge 1, CE1) connected to the PE1, and a CE2 connected to the PE2 are deployed in a network. An IPV4 address of the PE1 is 1.1.1.1, and an IPV4 address of the PE2 is 2.2.2.2.

A CE is a customer edge device directly connected to a service provider network. A PE is a network-side device of a service provider connected to the CE. The PE is mainly responsible for access of a VPN service, mapping and forwarding a packet from a user network to a public network tunnel, and from the public network tunnel to the user network.

The CE and the PE are connected by an attachment circuit (AC). The AC is a physical circuit or a virtual circuit that connects the CE and the PE. The AC may be, for example, an Ethernet interface.

The PEs are connected to one another based on a pseudo-wire. The pseudo-wire is a virtual bidirectional connection between two PEs. In other words, the PW included in this application is directional. For any two PEs, the PW between the two PEs essentially refers to two unidirectional transmission PWs in opposite directions. For example, for the PE1 and the PE2 in FIG. 1, for the PE1, a destination of a PW between the PE1 and the PE2 is the PE2, and for the PE2, a destination of a PW between the PE1 and the PE2 is the PE1. In other words, the PW between the PE1 and the PE2 includes a PW in a direction from the PE1 to the PE2 and a PW in a direction from the PE2 to the PE1.

The PW technology is a service bearing technology. A time division multiplexing (TDM) service, a synchronous digital hierarchy (SDH) service, a synchronous optical network (SONET) service, an asynchronous transfer mode (ATM) service, a frame relay service, and an Ethernet service can all be born on the PW. The PW may be a PW based on any type of tunnel such as an SR-MPLS tunnel or an SRv6 tunnel. In other words, the PW is born in a public network tunnel, which may be an LSP, MPLS TE, a GRE tunnel, an SR-MPLS tunnel, or an SRv6 tunnel.

It should be noted that FIG. 1 is described by using an example in which there are two PEs and each PE is connected to a CE. A quantity of PEs included in VPWS networking and a quantity of CEs connected to the PEs are not limited in this embodiment of this application.

FIG. 1 describes, by using VPWS networking as an example, a network architecture included in this embodiment of this application. Optionally, the method according to this embodiment of this application is also applied to VPLS networking. A network architecture of the VPLS networking is basically the same as the network architecture of the VPWS networking. Therefore, details are not described herein again.

As shown in FIG. 1, it is assumed that both the PE1 and the PE2 support a hybrid mode in the MPLS scenario. In other words, both the PE1 and the PE2 support an MPLS L2VPN VPWS and an MPLS EVPN VPWS. In this scenario, assuming that a first PW configured to transmit a packet between the CE1 and the CE2 has been established between the PE1 and the PE2 through the MPLS L2VPN VPWS service, and the first PW may also be referred to as an L2VPN PW, when a second PW configured to transmit a packet between the CE1 and the CE2 is established between the PE1 and the PE2 based on the MPLS EVPN VPWS service, because a function of the first PW is completely the same as a function of the second PW, the first PW needs to be processed when the second PW is established, to avoid an error when the PE1 and the PE2 perform packet forwarding. An occasion for the PE1 to establish the second PW is as follows: When receiving an MPLS EVPN VPWS route advertisement packet issued by the PE2, the PE1 establishes the second PW from the PE1 to the PE2 based on information carried in the MPLS EVPN VPWS route advertisement packet.

In this embodiment of this application, processing the first PW may refer to disabling the first PW. The disabling the first PW specifically means that the PE1 locally deletes a forwarding entry of the first PW or invalidates a forwarding entry of the first PW. In this way, when forwarding a packet between the CE1 and the CE2 subsequently, the PE1 cannot find the first PW in local forwarding entries, and further cannot forward the packet between the CE1 and the CE2 based on the first PW.

In this embodiment of this application, processing the first PW may also refer to configuring a priority of the second PW to be higher than a priority of the first PW, that is, lowering the priority of the first PW. The priority of the PW is also a priority of a forwarding entry of the PW. In this way, when the PE1 subsequently forwards a packet between the CE1 and the CE2, forwarding entries of the first PW and the second PW found in local forwarding entries can both be configured to forward the packet between the CE1 and the CE2. However, because the priority of the second PW is higher than the priority of the first PW, the second PW is preferentially used to when the packet is forwarded between the CE1 and the CE2.

It should be noted that, in the scenario shown in FIG. 1, because both the first PW and the second PW are constructed in the MPLS scenario, for the PE1, a destination address of the first PW and a destination address of the second PW are both the IPV4 address of the PE2. Therefore, when the PE1 establishes the second PW, the PE1 can successfully find the first PW locally based on the destination address of the second PW, and then process the first PW.

Figure 2:
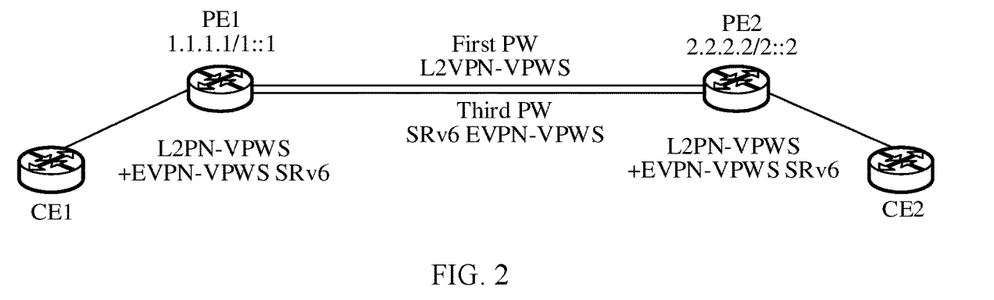
FIG. 2 is a schematic diagram of a network architecture of another VPWS according to an embodiment of this application.

However, as shown in FIG. 2, assuming that a first PW configured to transmit a packet between the CE1 and the CE2 has been established between the PE1 and the PE2 based on an MPLS L2VPN VPWS service, but currently the PE1 and the PE2 already support an SRv6 EVPN VPWS service, a third PW configured to transmit a packet between the CE1 and the CE2 may be established based on the SRv6 EVPN VPWS. Similarly, when the third PW is established between the PE1 and the PE2, because a function of the third PW is the same as a function of the first PW, the first PW needs to be processed when the third PW is established, to avoid an error when the PE1 and the PE2 perform packet forwarding. An occasion for the PE1 to establish the third PW is as follows: When receiving an EVPN VPWS SRv6 route advertisement packet issued by the PE2, the PE1 establishes the third PW from the PE1 to the PE2 based on information carried in the EVPN VPWS SRv6 route advertisement packet.

It should be noted that, in a scenario shown in FIG. 2, because the first PW is constructed in the MPLS scenario, for the PE1, a destination address of the first PW is the IPV4 address of the PE2. However, when the PE1 establishes the third PW, a destination address of the third PW carried in the EVPN VPWS SRv6 route advertisement packet is an IPV6 address of the PE2. In this scenario, the PE1 cannot find the first PW locally based on the destination address of the third PW, and therefore, cannot process the first PW. As a result, the MPLS forwarding-based L2VPN VPWS cannot be evolved into the SRv6 forwarding-based EVPN VPWS.

Based on the foregoing problem, an embodiment of this application provides a route advertisement method, so that the first PW can be processed timely when the third PW is established, thereby evolving the MPLS forwarding-based L2VPN VPWS into the SRv6 forwarding-based EVPN VPWS. The following describes in detail the route advertisement method according to an embodiment of this application.

Figure 3:
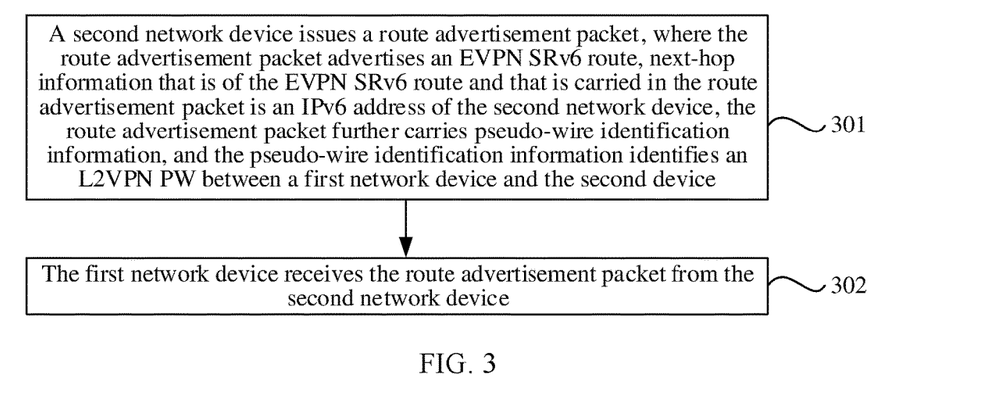
FIG. 3 is a flowchart of a route advertisement method according to an embodiment of this application.

FIG. 3 is a flowchart of a route advertisement method according to an embodiment of this application. As shown in FIG. 3, the method includes the following several steps.

Step 301: A second network device issues a route advertisement packet, where the route advertisement packet advertises an EVPN SRv6 route, next-hop information that is of the EVPN SRv6 route and that is carried in the route advertisement packet is an IPV6 address of the second network device, the route advertisement packet further carries pseudo-wire identification information, and the pseudo-wire identification information identifies a Layer 2 virtual private network-based pseudo-wire L2VPN PW between a first network device and the second device.

In a packet network, the first network device and the second network device may be specifically PEs. In this case, the first network device is also referred to as a first PE, and the second network device is also referred to as a second PE.

It can be learned from the foregoing content that the PW included in this embodiment of this application may be a PW in a VPWS, or may be a PW in a VPLS. Because the related content of the PW in the VPLS is basically the same as the related content in the VPWS, an example in which the PW is the PW in the VPWS is used for description in the following embodiments. When the PW included in this embodiment of this application is the PW in the VPLS, the route advertisement method provided in this embodiment of this application may also be implemented with reference to the following embodiments.

When the PW is the PW in the VPWS, the route advertisement packet issued by the second network device is an EVPN-VPWS route advertisement packet. In this scenario, when receiving the route advertisement packet, the second network device may create, based on information carried in the route advertisement packet, the PW in the EVPN-VPWS between the first network device and the second network device. Specific information carried in the EVPN-VPWS route advertisement packet is described in subsequent content, and is not described herein in detail.

Before the first network device establishes the PW between the first network device and the second network device based on the EVPN-VPWS route advertisement packet, if the first network device has established a PW based on the L2VPN-VPWS, the established L2VPN PW needs to be processed. As described above, processing the L2VPN PW may be disabling the L2VPN PW or lowering a priority of the L2VPN PW. In both the processing processes, a forwarding entry of the L2VPN PW needs to be found in local forwarding entries first, to delete the forwarding entry of the L2VPN PW or lower a priority of the forwarding entry of the L2VPN PW. Therefore, in this embodiment of this application, to successfully process the established L2VPN PW, the EVPN-VPWS route advertisement packet needs to carry pseudo-wire identification information of the established L2VPN PW. The pseudo-wire identification information identifies the L2VPN PW between the first network device and the second network device, to help find, based on the pseudo-wire identification information, the forwarding entry associated with the L2VPN PW, and further process the forwarding entry associated with the L2VPN PW.

Specifically, the pseudo-wire identification information of the L2VPN PW includes one or more of the following: an IPV4 address (origin IP) of the second network device, an identifier of the L2VPN PW (the identifier of the PW may be specifically a virtual channel identifier (VC ID)), and a site identifier (site ID). The site identifier is a parameter that uniquely identifies a CE in a same VPN, and CE IDs in the same VPN need to be different from one another. Based on the foregoing PW creation process, it can be learned that each PW is bound to a locally connected CE. Therefore, the site identifier can also identify the PW.

For example, in the networking shown in FIG. 2, when the PE1 receives the EVPN-VPWS SRv6 route advertisement packet sent by the PE2, a destination address of a to-be-created PW carried in the EVPN-VPWS SRv6 route advertisement packet is an address 2::2 of the PE2 in an SRv6 network. In this case, it indicates that the PW in the EVPN-VPWS SRv6 needs to be established. For ease of subsequent description, the PW is referred to as an EVPN SRv6 PW. Because an address of the PE2 in an IPV4 network is 2.2.2.2, if the PE1 has previously established the L2VPN PW from the PE1 to the PE2, pseudo-wire identification information of the L2VPN PW, for example, the address of the PE2, is the address 2.2.2.2 in the IPV4 network. Therefore, if the EVPN-VPWS SRv6 route advertisement packet is not extended, the forwarding entry of the L2VPN PW cannot be found based on the address 2::2 in the SRv6 network carried in the EVPN-VPWS SRv6 route advertisement packet, and further, the L2VPN PW cannot be processed. In this way, even if the PE2 issues the EVPN-VPWS SRv6 route advertisement packet, a forwarding plane and a control plane are still run in the L2VPN VPWS.

Based on the foregoing problem, in this embodiment of this application, to enable the EVPN-VPWS SRv6 route advertisement packet to carry the pseudo-wire identification information of the L2VPN PW between the first network device and the second network device, an existing EVPN-VPWS SRv6 route advertisement packet is extended, so that the extended EVPN-VPWS SRv6 route advertisement packet carries the pseudo-wire identification information of the L2VPN PW between the first network device and the second network device.

The EVPN-VPWS SRv6 route advertisement packet usually includes two parts. One part is a prefix field, and the prefix field indicates an identifier of the EVPN SRv6 PW that needs to be established. The other part is an attribute field, and the attribute field indicates a related attribute of the EVPN SRv6 PW. Therefore, in a possible implementation, the attribute field in the EVPN-VPWS SRv6 route advertisement packet may be extended. The attribute field may be a community attribute field or an extended community attribute field, so that an extended community attribute or an extended community attribute after being further extended can carry the pseudo-wire identification information of the L2VPN PW between the first network device and the second network device. Specifically, the extended community attribute field in the EVPN-VPWS route advertisement packet may be extended in the following two manners.

(1) Extend a New Extended Community Attribute

In a possible implementation, a new extended community attribute may be extended. The new extended community attribute includes a type field and a pseudo-wire identifier field. The type field indicates that a function of the extended community attribute is carrying the pseudo-wire identification information. The pseudo-wire identifier field carries the pseudo-wire identification information of the L2VPN PW between the first network device and the second network device.

Figure 4:
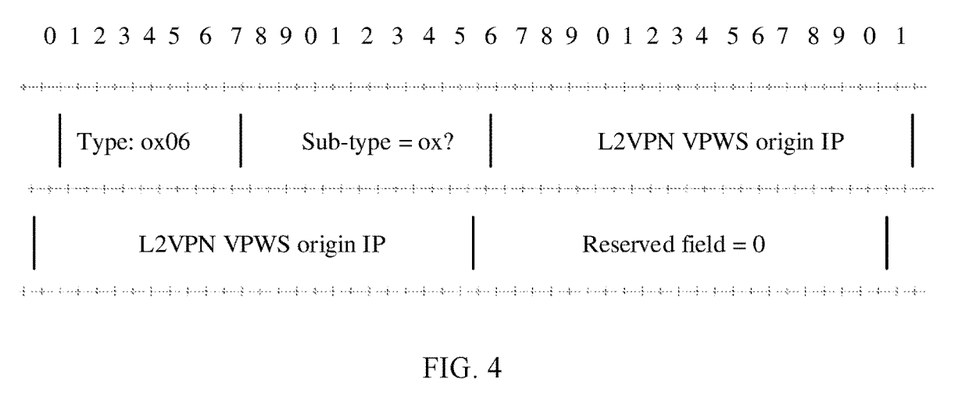
FIG. 4 is a schematic diagram of a format of an extended new extended community attribute according to an embodiment of this application.

FIG. 4 is a schematic diagram of a format of an extended new extended community attribute according to an embodiment of this application. As shown in FIG. 4, the extended community attribute includes a type field, a sub-type field, an L2VPN PW address (represented as L2VPN VPWS origin IP in FIG. 4) field, and a reserved field. The type field may be 0x06, which indicates that the extended community attribute is an EVPN-type community attribute. The sub-type field is a type that needs to be newly applied for, and the type indicates that the extended community attribute is an extended community attribute carrying the L2VPN PW address. The L2VPN PW address field carries the IPV4 address of the second network device. The reserved field has no other function currently, and therefore, is set to 0.

It should be noted that FIG. 4 is an example of a format of an extended new extended community attribute. The format of the extended new extended community attribute is not limited in this embodiment of this application provided that the extended new extended community attribute can carry the pseudo-wire identification information of the L2VPN PW between the first network device and the second network device.

(2) Extend a Field in an Existing Community Attribute

In another possible implementation, an IPV4 address specific extended community attribute in Request for Comments (RFC) 4360 may be extended, so that the IPV4 address specific extended community attribute can carry the pseudo-wire identification information of the L2VPN PW between the first network device and the second network device.

Figure 5:
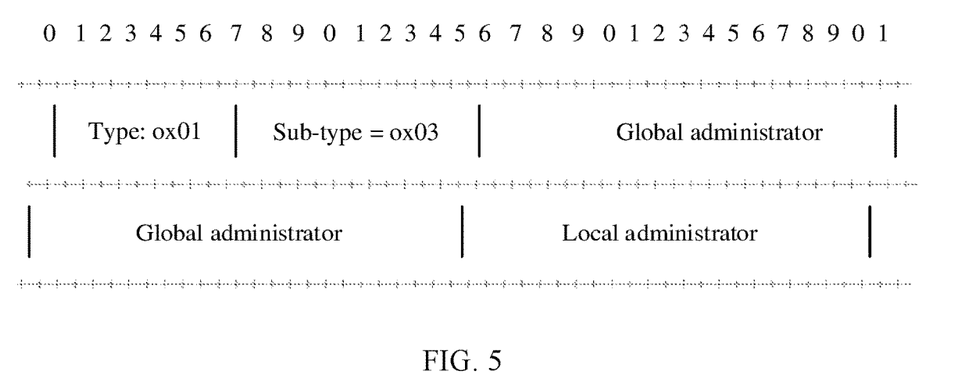
FIG. 5 is a schematic diagram of a format of an IPv4 address specific extended community attribute according to an embodiment of this application.

FIG. 5 is a schematic diagram of a format of an IPV4 address specific extended community attribute according to an embodiment of this application. As shown in FIG. 5, the extended community attribute includes a type field and a global administrator field. The type field is 0x01, which indicates that a function of the community attribute is carrying feature information of the IPV4 address. The global administrator field carries an L2VPN PW address (represented as L2VPN VPWS origin IP in FIG. 5). Local Administrator in FIG. 5 may be set to 0). In addition, as shown in FIG. 5, a sub-type field in the extended community attribute is 0x03, which indicates a route origin.

It should be noted that the foregoing descriptions are provided by using an example in which the IPV4 address specific extended community attribute in RFC 4360 is extended. Optionally, an existing extended community attribute in another standard may also be extended, so that the extended community attribute after being further extended can carry the pseudo-wire identification information of the L2VPN PW between the first network device and the second network device.

In addition, for the second network device, because the L2VPN VPWS and the EVPN-VPWS are in a same VPN instance, when issuing the EVPN-VPWS SRv6 route advertisement packet, the second network device can obtain the pseudo-wire identification information of the L2VPN PW created in the L2VPN VPWS. Further, the pseudo-wire identification information of the L2VPN PW is carried in the EVPN-VPWS SRv6 route advertisement packet as shown in FIG. 4 or FIG. 5. Then the EVPN-VPWS SRv6 route advertisement packet is issued to the first network device. The first network device receives the EVPN-VPWS SRv6 route advertisement packet through the following step 302.

For example, in the networking shown in FIG. 2, when issuing the EVPN-VPWS SRv6 route advertisement packet, the PE2 includes the IPV4 address 2.2.2.2 of the PE2 in the EVPN-VPWS SRv6 route advertisement packet.

Step 302: The first network device receives the route advertisement packet from the second network device.

When receiving the route advertisement packet, the first network device may process the L2VPN PW between the first network device and the second network device.

In a possible implementation, when the route advertisement packet is an EVPN-VPWS SRv6 route advertisement packet, the first network device may establish an EVPN SRv6 PW based on the route advertisement packet. A destination address of the EVPN SRv6 PW is the IPV6 address of the second network device. When the EVPN SRv6 PW is established, based on the pseudo-wire identification information, the L2VPN PW may be disabled, or the priority of the EVPN SRv6 PW may be configured to be higher than the priority of the L2VPN PW. The two processes, that is, disabling the L2VPN PW and establishing the EVPN SRv6 PW, can be performed in any order. This is not limited in this embodiment of this application.

The first network device disables the L2VPN PW. In other words, a forwarding entry of the L2VPN PW is found in local forwarding entries based on the pseudo-wire identification information, and then the forwarding entry of the L2VPN PW is deleted or the forwarding entry of the L2VPN PW is invalidated. The first network device configures the priority of the EVPN SRv6 PW to be higher than the priority of the L2VPN PW. In other words, a priority of the forwarding entry of the EVPN SRv6 PW is set to be higher than a priority of the forwarding entry of the L2VPN PW.

For example, in the networking shown in FIG. 2, when issuing the EVPN-VPWS SRv6 route advertisement packet, the PE2 includes the IPV4 address 2.2.2.2 of the PE2 in the EVPN-VPWS SRv6 route advertisement packet. In this way, the PE1 may find the L2VPN PW from the PE1 to the PE2 based on the IPV4 address 2.2.2.2, and then disable the L2VPN PW or adjust the priority of the L2VPN PW.

In addition, in the EVPN-VPWS, if the first network device is the first PE, and the second network device is the second PE, the first PE and the second PE each pre-configure a local service identifier (local service ID) and a remote service identifier (remote service ID). The local service identifier configured by any PE indicates a CE connected to the PE. The configured remote service identifier indicates a CE connected to another PE. The configured local service identifier and the configured remote service identifier are paired. In other words, each local service identifier corresponds to a remote service identifier, or each remote service identifier corresponds to a local service identifier. In addition, any PE binds a PW identifier to each local service identifier.

In this way, the second PE may issue an EVPN-VPWS route advertisement packet. The EVPN-VPWS route advertisement packet carries the local service identifier configured by the second PE and the PW identifier bound to the local service identifier. For ease of subsequent description, the local service identifier carried in the EVPN-VPWS route advertisement packet is referred to as a first local service identifier. When receiving the EVPN-VPWS route advertisement packet, the first PE matches the first local service identifier with the remote service identifier configured in the first PE. If the first local service identifier is consistent with the remote service identifier configured in the first PE, it indicates that the EVPN-VPWS route advertisement packet advertises that the first PE creates a PW in the EVPN-VPWS.

Therefore, when receiving the EVPN-VPWS route advertisement packet, the first PE matches the first local service identifier carried in the EVPN-VPWS route advertisement packet with the remote service identifier configured in the first PE. If the first local service identifier is consistent with a remote service identifier configured in the first PE, the first PE creates the PW in the EVPN-VPWS. A specific operation is as follows: The first PE establishes a correspondence among an identifier of a to-be-created PW carried in the EVPN-VPWS route advertisement packet, a locally configured local service identifier corresponding to the remote service identifier, and next-hop information carried in the EVPN-VPWS route advertisement packet. The correspondence is a forwarding entry. In this way, a PW from the first PE to the second PE is established. For ease of subsequent description, the local service identifier corresponding to the remote service identifier is referred to as a second local service identifier.

Subsequently, when receiving a packet sent by a CE indicated by the second local service identifier, the first PE may find the PW identifier and the next-hop information based on the correspondence, and send the packet based on the found information. Alternatively, when a packet carrying the PW identifier is received, the second local service identifier is found based on the correspondence, and then the packet is sent to a CE indicated by the second local service identifier.

It should be noted that, in all the implementations of step 301 to step 302, the EVPN-VPWS is used as an example for description. In another possible implementation, the route advertisement packet may be an EVPN-VPLS route advertisement packet. Because the networking of the EVPN-VPLS is basically the same as the networking of the EVPN-VPWS, implementations of step 301 to step 302 are also basically the same. Details are not described herein again.

In addition, the foregoing route advertisement packet is described by using an example in which the PW in the EVPN-VPWS or VPLS is advertised. In this case, the MPLS forwarding-based L2VPN VPWS or VPLS can be evolved into the SRv6 forwarding-based EVPN-VPWS or VPLS based on the route advertisement method shown in FIG. 3. Optionally, the route advertisement method shown in FIG. 3 may also be applied to advertising another type of EVPN SRv6 route. In this scenario, the MPLS forwarding-based L2VPN VPWS or VPLS can be evolved into another type of EVPN SRv6 network based on the route advertisement method shown in FIG. 3. Examples are not described one by one in this embodiment of this application.

To sum up, in this embodiment of this application, the EVPN SRv6 route advertisement packet is extended. The extended EVPN SRv6 route advertisement packet carries the pseudo-wire identification information of the L2VPN PW between the first network device and the second network device. The forwarding entry associated with the L2VPN PW is found based on the pseudo-wire identification information. The forwarding entry associated with the L2VPN PW is processed. In this way, the MPLS forwarding-based L2VPN VPWS or VPLS is evolved into the SRv6 forwarding-based EVPN VPWS or VPLS. In addition, through the method provided this embodiment of this application, the MPLS forwarding-based L2VPN VPWS or VPLS can also be evolved into another type of EVPN SRv6 network.

Based on the embodiment shown in FIG. 3, the MPLS forwarding-based L2VPN VPWS or VPLS can be evolved into the EVPN SRv6 network. Optionally, an embodiment of this application further provides a route advertisement method. Based on the route advertisement method, an MPLS network forwarding-based EVPN-VPWS can be evolved into an SRv6 network forwarding-based EVPN-VPWS. The following describes the route advertisement method in detail.

Figure 6:
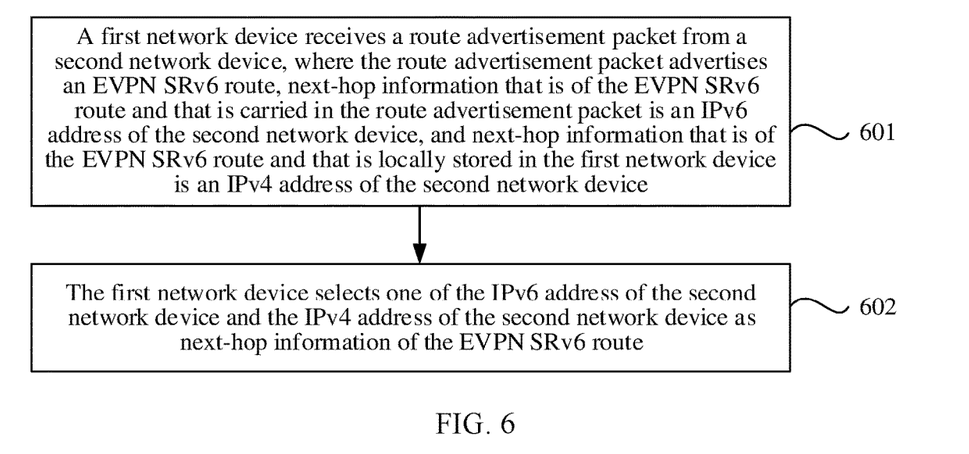
FIG. 6 is a flowchart of another route advertisement method according to an embodiment of this application.

FIG. 6 is a flowchart of another route advertisement method according to an embodiment of this application. As shown in FIG. 6, the method includes the following several steps.

Step 601: A first network device receives a route advertisement packet from a second network device, where the route advertisement packet advertises an EVPN SRv6 route, next-hop information that is of the EVPN SRv6 route and that is carried in the route advertisement packet is an IPV6 address of the second network device, and next-hop information that is of the EVPN SRv6 route and that is locally stored in the first network device is an IPV4 address of the second network device.

An application scenario of the route advertisement method shown in FIG. 6 is that an MPLS EVPN PW has been established between the first network device and the second network device. Because both the route advertisement packet based on which the MPLS EVPN PW is established and the route advertisement packet advertising the EVPN SRv6 route in step 601 are issued based on a BGP protocol, the two route advertisement packets advertise a same route. In this way, when the first network device receives the route advertisement packet advertising the EVPN SRv6 route, next-hop information of the EVPN SRv6 route has been locally configured based on a previously received route advertisement packet. Therefore, the first network device needs to modify, based on the next-hop information in the re-received route advertisement packet, the next-hop information of the EVPN SRv6 route that is locally configured.

For example, for the networking shown in FIG. 3, it is assumed that the EVPN PW in the MPLS scenario has been established between the PE1 and the PE2 based on the received route advertisement packet. For the PE1, the destination address of the EVPN PW is the IPV4 address of the PE2. When the PE1 receives the route advertisement packet in step 601, it indicates that an EVPN PW whose destination address is the IPV6 address of the PE2 needs to be established currently. In other words, the EVPN PW in the SRv6 scenario needs to be established. In this case, the PE1 needs to select one of the two pieces of next-hop information as the destination address of the EVPN PW through the following step 602.

Step 602: The first network device selects one of the IPV6 address of the second network device and the IPV4 address of the second network device as next-hop information of the EVPN SRv6 route.

In a possible implementation, step 602 may be obtained through configuration performed by an administrator. In other words, the administrator selects which address in the IPV6 address of the second network device and the IPV4 address of the second network device as the next-hop information of the EVPN SRv6 route. For example, the administrator may modify the locally stored next-hop information of the EVPN SRv6 route from the IPV4 address of the second network device to the IPV6 address of the second network device.

Based on step 601 and step 602, the MPLS network forwarding-based EVPN-VPWS can be evolved into the SRv6 network forwarding-based EVPN-VPWS, or the MPLS network forwarding-based EVPN-VPLS can be evolved into the SRv6 network forwarding-based EVPN-VPLS.

Figure 7:
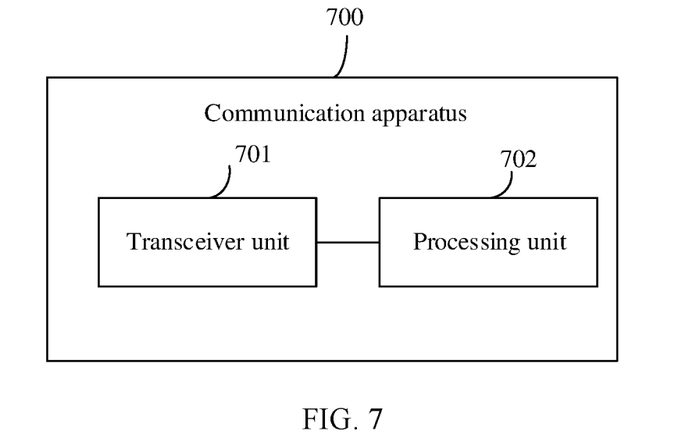
FIG. 7 is a schematic diagram of a structure of a communication apparatus according to an embodiment of this application.

In addition, an embodiment of this application further provides a communication apparatus 700. FIG. 7 is a schematic diagram of a structure of a communication apparatus according to an embodiment of this application. The communication apparatus 700 includes a transceiver unit 701 and a processing unit 702. The communication apparatus 700 may be configured to perform the route advertisement method shown in FIG. 4 or the route advertisement method shown in FIG. 6.

In an example, the communication apparatus 700 may perform the embodiment shown in FIG. 4. When the communication apparatus 700 is configured to perform the embodiment shown in FIG. 4, the communication apparatus 700 is equivalent to the first network device in the embodiment of FIG. 4. The transceiver unit 701 is configured to perform the receiving and sending operations performed by the first network device in the embodiment of FIG. 4. The processing unit 702 is configured to perform an operation, other than the receiving and sending operations, performed by the first network device in the embodiment of FIG. 4. For example, the transceiver unit 701 is configured to receive a route advertisement packet from a second network device. The route advertisement packet advertises an EVPN SRv6 route. Next-hop information that is of the EVPN SRv6 route and that is carried in the route advertisement packet is an IPV6 address of the second network device. The route advertisement packet further carries pseudo-wire identification information. The pseudo-wire identification information identifies a Layer 2 virtual private network-based pseudo-wire L2VPN PW between the first network device and the second device. The processing unit 702 is configured to process the L2VPN PW based on the pseudo-wire identification information, for example, disable the L2VPN PW, or configured to establish an EVPN SRv6 PW, and configure a priority of the EVPN SRv6 PW to be higher than a priority of the L2VPN PW.

In an example, the communication apparatus 700 may perform the embodiment shown in FIG. 4. When the communication apparatus 700 is configured to perform the embodiment shown in FIG. 4, the communication apparatus 700 is equivalent to the second network device in the embodiment shown in FIG. 4. The transceiver unit 701 is configured to perform the receiving and sending operations performed by the second network device in the embodiment shown in FIG. 4. The processing unit 702 is configured to perform an operation, other than the receiving and sending operations performed by the second network device in the embodiment shown in FIG. 4. For example, the processing unit 702 is configured to generate a route advertisement packet advertising an EVPN SRv6 route. The route advertisement packet advertises the EVPN SRv6 route. Next-hop information that is of the EVPN SRv6 route and that is carried in the route advertisement packet is an IPV6 address of the second network device. The route advertisement packet further carries pseudo-wire identification information. The pseudo-wire identification information identifies a Layer 2 virtual private network-based pseudo-wire L2VPN PW between the first network device and the second device. The transceiver unit 701 is configured to send the route advertisement packet to the first network device, to trigger the first network device to process the L2VPN PW based on the pseudo-wire identification information.

In an example, the communication apparatus 700 may perform the embodiment shown in FIG. 6. When the communication apparatus 700 is configured to perform the embodiment shown in FIG. 6, the communication apparatus 700 is equivalent to the first network device in the embodiment shown in FIG. 6. The transceiver unit 701 is configured to perform the receiving and sending operations performed by the first network device in the embodiment shown in FIG. 6. The processing unit 702 is configured to perform an operation, other than the receiving and sending operations, performed by the first network device in the embodiment shown in FIG. 6. For example, the transceiver unit 701 is configured to receive a route advertisement packet sent by the second network device. The route advertisement packet advertises an EVPN SRv6 route. Next-hop information that is of the EVPN SRv6 route and that is carried in the route advertisement packet is an IPV6 address of the second network device, and next-hop information that is of the EVPN SRv6 route and that is locally stored in the first network device is an IPV4 address of the second network device. The processing unit 702 is configured to select one of the IPV6 address of the second network device and the IPV4 address of the second network device as next-hop information of the EVPN SRv6 route.

In an example, when the communication apparatus 700 is configured to perform the embodiment shown in FIG. 6 in the foregoing embodiments, the communication apparatus 700 is equivalent to the second network device in the embodiment shown in FIG. 6. The transceiver unit 701 is configured to perform the receiving and sending operations performed by the second network device in the embodiment shown in FIG. 6. The processing unit 702 is configured to perform an operation, other than the receiving and sending operations, performed by the second network device in the embodiment shown in FIG. 6. For example, the processing unit 702 is configured to generate a route advertisement packet. The route advertisement packet advertises an EVPN SRv6 route. Next-hop information that is of the EVPN SRv6 route and that is carried in the route advertisement packet is an IPV6 address of the second network device, and next-hop information that is of the EVPN SRv6 route and that is locally stored in the first network device is an IPV4 address of the second network device. The transceiver unit 701 is configured to send the route advertisement packet to the first network device, to trigger the first network device to select one of the IPV6 address of the second network device and the IPV4 address of the second network device as next-hop information of the EVPN SRv6 route.

It should be noted that, in this embodiment of this application, division into the units is an example, and is merely a logical function division. In actual implementation, another division manner may be used. Functional units in embodiments of this application may be integrated into one processing unit, or each of the units may exist alone physically, or two or more units may be integrated into one unit. For example, in the foregoing embodiment, the transceiver unit 701 and the processing unit 702 may be a same unit or different units. The integrated unit may be implemented in a form of hardware, or may be implemented in a form of a software functional unit.

Figure 8:
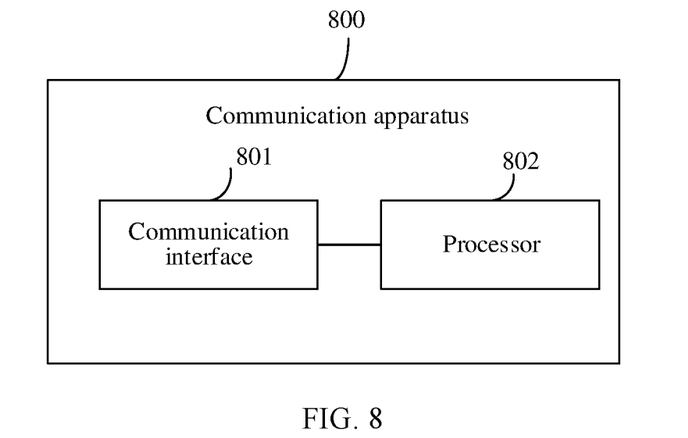
FIG. 8 is a schematic diagram of a structure of another communication apparatus according to an embodiment of this application.

In addition, an embodiment of this application further provides a communication apparatus 800. FIG. 8 is a schematic diagram of a structure of a communication apparatus according to an embodiment of this application. The communication apparatus 800 includes a communication interface 801 and a processor 802 connected to the communication interface 801. The communication interface is, for example, an apparatus such as a transceiver. The communication apparatus 800 may be configured to perform the embodiment shown in FIG. 4 or the embodiment shown in FIG. 6. Specifically, the communication apparatus 800 may be used as a first network device, to respectively perform operations performed by the first network device in the embodiment shown in FIG. 4 or the embodiment shown in FIG. 6. Alternatively, the communication apparatus 800 may be used as a second network device, to respectively perform operations performed by the second network device in the embodiment shown in FIG. 4 or the embodiment shown in FIG. 6. The communication interface 801 is configured to perform the receiving and sending operations performed by the first network device or the second network device in the foregoing method embodiments. The processor 802 is configured to perform an operation, other than the receiving and sending operations, performed by the first network device or the second network device in the foregoing method embodiments.

For example, when the communication apparatus 800 is used as the first network device to perform the embodiment shown in FIG. 4, the communication interface 801 is configured to receive a route advertisement packet from the second network device. The route advertisement packet advertises an EVPN SRv6 route. Next-hop information that is of the EVPN SRv6 route and that is carried in the route advertisement packet is an IPV6 address of the second network device. The route advertisement packet further carries pseudo-wire identification information. The pseudo-wire identification information identifies a Layer 2 virtual private network-based pseudo-wire L2VPN PW between the first network device and the second device. The processor 802 is configured to process the L2VPN PW based on the pseudo-wire identification information, for example, disable the L2VPN PW, or configured to establish an EVPN SRv6 PW, and configure a priority of the EVPN SRv6 PW to be higher than a priority of the L2VPN PW.

Figure 9:
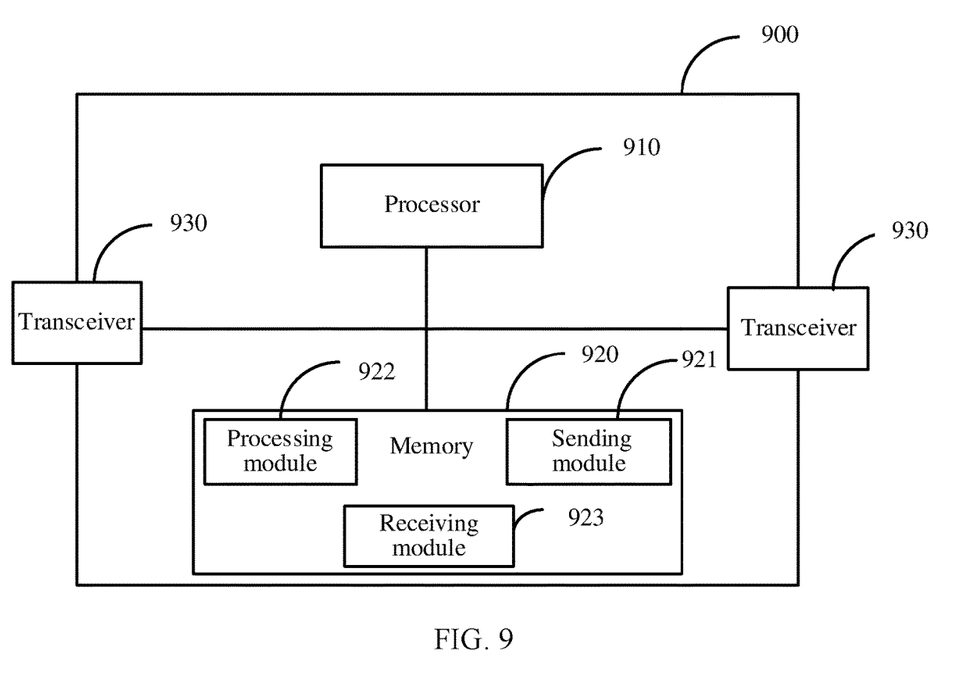
FIG. 9 is a schematic diagram of a structure of another communication apparatus according to an embodiment of this application.

In addition, an embodiment of this application further provides a communication apparatus 900. FIG. 9 is a schematic diagram of a structure of a communication apparatus according to an embodiment of this application. As shown in FIG. 9, the communication apparatus 900 may include a processor 910, a memory 920 coupled to the processor 910, and a transceiver 930. The transceiver 930 may be, for example, a communication interface, an optical module, or the like. The processor 910 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 910 may be one processor, or may include a plurality of processors. The memory 920 may be a volatile memory such as a random access memory (RAM). The memory may further be a non-volatile memory such as a read-only memory (ROM), a flash memory, a hard disk drive (HDD), or a solid-state drive (SSD). The memory 920 may further be a combination of the foregoing types of memories. The memory 920 may be one memory, or may include a plurality of memories.

In an implementation, the memory 920 stores computer-readable instructions. The computer-readable instructions may include a plurality of software modules, for example, a sending module 921, a processing module 922, and a receiving module 923. The sending module 921 indicates a sending-related operation. The receiving module 923 indicates a receiving-related operation. The processing module indicates a processing-related operation. After executing each software module, the processor 910 may perform a corresponding operation based on instructions of each software module. An operation performed by a software module actually refers to an operation performed by the processor 910 based on instructions of the software module. Optionally, the processor 910 may also store program code or instructions for executing the solutions of this application. In this case, the processor 701 does not need to read the program code or the instructions from the memory 920.

The communication apparatus 900 may be configured to perform the embodiment shown in FIG. 4 or the embodiment shown in FIG. 6. The communication apparatus 900 may be configured to perform the embodiment shown in FIG. 4 or the embodiment shown in FIG. 6. Specifically, the communication apparatus 900 may be used as a first network device, to respectively perform operations performed by the first network device in the embodiment shown in FIG. 4 or the embodiment shown in FIG. 6. Alternatively, the communication apparatus 900 may be used as a second network device, to respectively perform operations performed by the second network device in the embodiment shown in FIG. 4 or the embodiment shown in FIG. 6. For example, when the communication apparatus 900 is used as the first network device to perform the embodiment shown in FIG. 4, the processor 910 is configured to perform related instructions in the memory 920, so that the communication apparatus 900 is configured to receive a route advertisement packet from the second network device. The route advertisement packet advertises an EVPN SRv6 route. Next-hop information that is of the EVPN SRv6 route and that is carried in the route advertisement packet is an IPV6 address of the second network device. The route advertisement packet further carries pseudo-wire identification information. The pseudo-wire identification information identifies a layer 2 virtual private network-based pseudo-wire L2VPN PW between the first network device and the second device, so that the L2VPN PW is processed based on the pseudo-wire identification information.

An embodiment of this application further provides a computer-readable storage medium. The computer-readable storage medium stores instructions. When the instructions are run on a processor, any one or more operations in the method (the embodiment shown in FIG. 4 or FIG. 6) according to any one of the foregoing embodiments are implemented.

An embodiment of this application further provides a computer program product, including a computer program. When the computer program is run on a processor, any one or more operations in the method (for example, the embodiment shown in FIG. 4 or FIG. 6) according to any one of the foregoing embodiments are implemented.

An embodiment of this application further provides a communication system, including a first network device and a second network device. Structures of the first network device and the second network device are shown in any communication apparatus corresponding to FIG. 7 to FIG. 9. The communication system may be, for example, the communication system shown in FIG. 1 or FIG. 2. The communication system is configured to implement some or all of the operations in any one of the methods according to embodiments corresponding to FIG. 4 and FIG. 6.

An embodiment of this application further provides another communication system, including at least one memory and at least one processor. The at least one memory stores instructions, and the at least one processor executes the instructions, to enable the communication system to implement some or all of the operations in the method according to any embodiment of this application.

An embodiment of this application further provides a chip system, including a processor. The processor is coupled to a memory, and the memory is configured to store a program or instructions. When the program or the instructions are executed by the processor, the chip system is enabled to implement some or all of the operations in any one of the methods according to any embodiment of this application.

Optionally, there may be one or more processors in the chip system. The processor may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be an FPGA, an ASIC, a system on chip (SoC), a CPU, an NP, a digital signal processor (DSP), a micro controller unit (MCU), a programmable logic device (PLD), or another integrated chip.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments according to this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk drive, a read-only memory (ROM), a random access memory (RAM), a magnetic disk, or an optical disc.

A person skilled in the art should be aware that in the foregoing one or more examples, services described in the present invention may be implemented by hardware, software, firmware, or any combination thereof. When the services are implemented by software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present invention have been further described in detail in the foregoing specific implementations. It can be understood that the foregoing descriptions are merely specific implementations of the present invention.

The foregoing embodiments are merely intended for describing the technical solutions of this application instead of limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A route advertisement method comprising:
   receiving, by a first network device, a route advertisement packet from a second network device, wherein the route advertisement packet advertises an Ethernet virtual private network over segment routing over internet protocol version 6 (EVPN SRv6) route, next-hop information that is of the EVPN SRv6 route and that is carried in the route advertisement packet is an IPV6 address of the second network device, the route advertisement packet further carries pseudo-wire identification information, and the pseudo-wire identification information identifies a Layer 2 virtual private network-based pseudo-wire (L2VPN PW) between the first network device and the second network device; and
   disabling, by the first network device, the L2VPN PW based on the pseudo-wire identification information.

2. The method according to claim 1, further comprising:
   establishing, by the first network device, an EVPN SRv6 PW, wherein a destination address of the EVPN SRv6 PW is the IPV6 address of the second network device; and
   configuring a priority of the EVPN SRv6 PW to be higher than a priority of the L2VPN PW.

3. The method according to claim 2, wherein the EVPN SRv6 PW is a PW in a virtual private wire service (VPWS), or a PW in a virtual private local area network service (VPLS).

4. The method according to claim 1, wherein the route advertisement packet comprises an extended community attribute, and the extended community attribute carries the pseudo-wire identification information.

5. The method according to claim 4, wherein the extended community attribute comprises a type field and a pseudo-wire identifier field, the type field indicates that the extended community attribute carries the pseudo-wire identification information, and the pseudo-wire identifier field carries the pseudo-wire identification information.

6. The method according to claim 4, wherein the extended community attribute comprises a type field and a global administrator field, the type field indicates that the extended community attribute carries feature information of an internet protocol version 4 (IPv4) address, and the global administrator field carries the pseudo-wire identification information.

7. The method according to claim 1, wherein the pseudo-wire identification information comprises one or more of the following: an IPV4 address of the second network device, an identifier of the L2VPN PW, and a site identifier.

8. The method according to claim 1, wherein the disabling the L2VPN PW comprises deleting a forwarding entry associated with the L2VPN PW.

9. The method according to claim 1, wherein the disabling the L2VPN PW comprises invalidating a forwarding entry associated with the L2VPN PW.

10. A route advertisement method comprising:
issuing, by a second network device, a route advertisement packet to a first network device, wherein the route advertisement packet advertises an Ethernet virtual private network over segment routing over internet protocol version 6 (EVPN SRv6) route, next-hop information that is of the EVPN SRv6 route and that is carried in the route advertisement packet is an IPV6 address of the second network device, the route advertisement packet further carries pseudo-wire identification information, and the pseudo-wire identification information identifies a Layer 2 virtual private network-based pseudo-wire (L2VPN PW) between the first network device and the second network device; and
wherein the L2VPN PW is disabled by the first network device, based on the pseudo-wire identification information.

11. The method according to claim 10, wherein the route advertisement packet comprises an extended community attribute, and the extended community attribute carries the pseudo-wire identification information.

12. The method according to claim 11, wherein the extended community attribute comprises a type field and a pseudo-wire identifier field, the type field indicates that the extended community attribute carries the pseudo-wire identification information, and the pseudo-wire identifier field carries the pseudo-wire identification information.

13. The method according to claim 11, wherein the extended community attribute comprises a type field and a global administrator field, the type field indicates that the extended community attribute carries feature information of an internet protocol version 4 (IPv4) address, and the global administrator field carries the pseudo-wire identification information.

14. The method according to claim 10, wherein the pseudo-wire identification information comprises one or more of the following: an IPV4 address of the second network device, an identifier of the L2VPN PW, and a site identifier.

15. A first network device comprising:
a processor,
a memory, coupled to the processor and storing processor-executable instructions, which upon execution by the processor cause the first network device to perform an route advertisement method including:
receiving a route advertisement packet from a second network device, wherein the route advertisement packet advertises an Ethernet virtual private network over segment routing over internet protocol version 6 (EVPN SRv6) route, next-hop information that is of the EVPN SRv6 route and that is carried in the route advertisement packet is an IPV6 address of the second network device, the route advertisement packet further carries pseudo-wire identification information, and the pseudo-wire identification information identifies a Layer 2 virtual private network-based pseudo-wire (L2VPN PW) between the first network device and the second network device; and
disabling, the L2VPN PW based on the pseudo-wire identification information.

16. The first network device according to claim 15, wherein the processor is further configured to execute the processor-executable instructions which cause the first network device to perform:
establishing an EVPN SRv6 PW, wherein a destination address of the EVPN SRv6 PW is the IPV6 address of the second network device;
configuring a priority of the EVPN SRv6 PW to be higher than a priority of the L2VPN PW.

17. The first network device according to claim 16, wherein the EVPN SRv6 PW is a PW in a virtual private wire service (VPWS) or a PW in a virtual private local area network service (VPLS).

18. The first network device according to claim 15, wherein the route advertisement packet comprises an extended community attribute, and the extended community attribute carries the pseudo-wire identification information.

19. The first network device according to claim 18, wherein the extended community attribute comprises a type field and a pseudo-wire identifier field, the type field indicates that the extended community attribute carries the pseudo-wire identification information, and the pseudo-wire identifier field carries the pseudo-wire identification information.

20. The first network device according to claim 18, wherein the extended community attribute comprises a type field and a global administrator field, the type field indicates that the extended community attribute carries feature information of an internet protocol version 4 (IPv4) address, and the global administrator field carries the pseudo-wire identification information.

* * * * *